DIGIT RATE SYNCHRONISATION OF A NETWORK OF DIGITAL STATIONS

Filed Sept. 6, 1967

Fig. 1. (GENERAL SCHEMATIC)

INVENTORS
HOWARD MUMFORD
PETER WILLIAM SMITH
DAVID HALLIDAY
BY Young & Thompson
ATTYS.

DIGIT RATE SYNCHRONISATION OF A NETWORK OF DIGITAL STATIONS

Filed Sept. 6, 1967

INVENTORS
HOWARD MUMFORD
PETER WILLIAM SMITH
DAVID HALLIDAY
BY Young & Thompson
ATTYS.

DIGIT RATE SYNCHRONISATION OF A NETWORK OF DIGITAL STATIONS
Filed Sept. 6, 1967
Fig. 5. ("CD" IN FIG. 1)
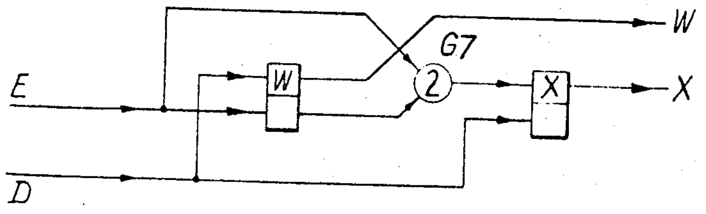
("FC" IN FIG. 1)
Fig. 6.
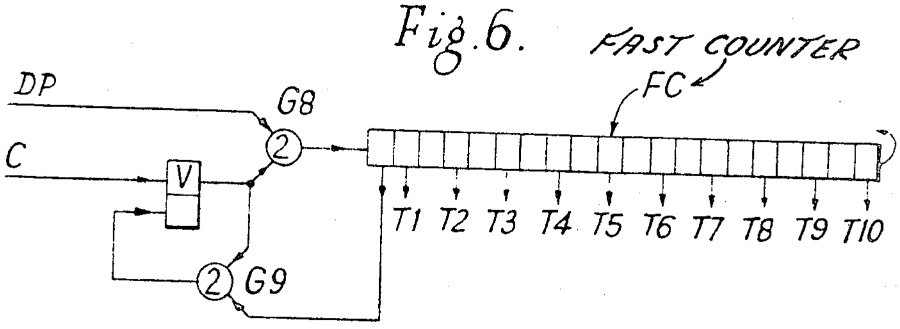
INVENTORS
HOWARD MUMFORD
PETER WILLIAM SMITH
DAVID HALLIDAY
BY Young & Thompson
ATTYS.

Fig. 7. ("AS" IN FIG. 1)
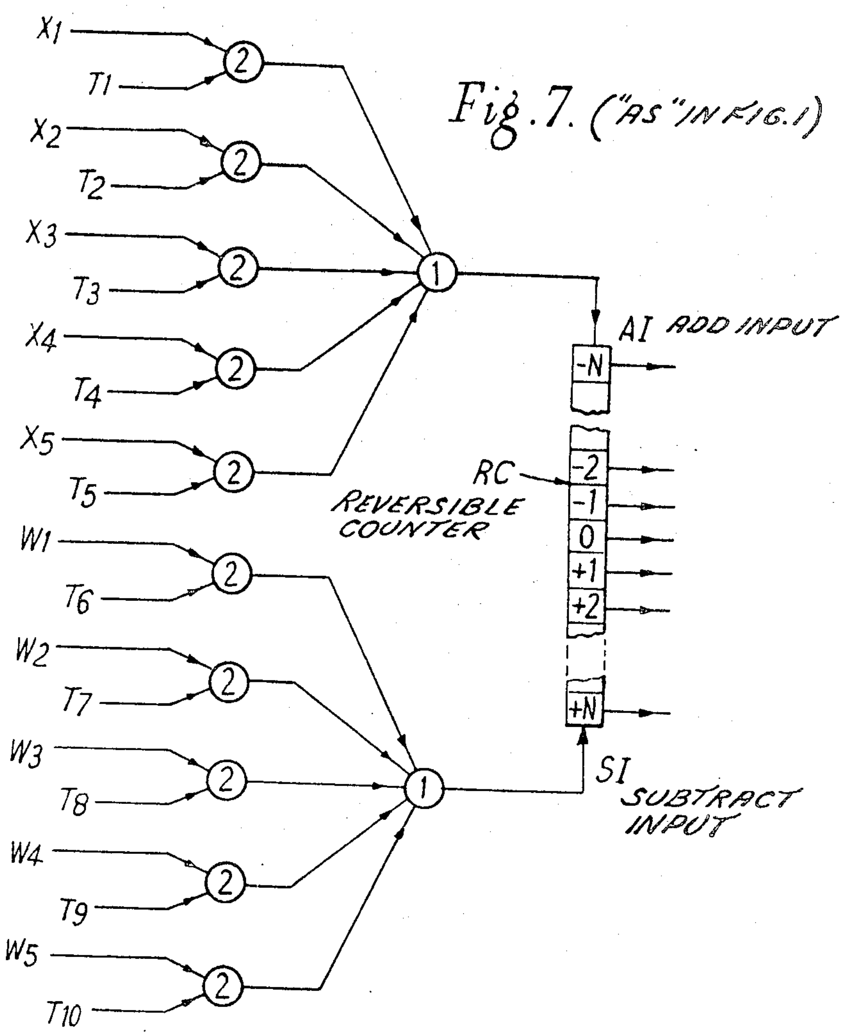
INVENTORS
HOWARD MUMFORD
PETER WILLIAM SMITH
DAVID HALLIDAY
BY Young + Thompson
ATTYS Fig. 8. (TIME DIAGRAM, SLOW INCOMING SIGNAL)
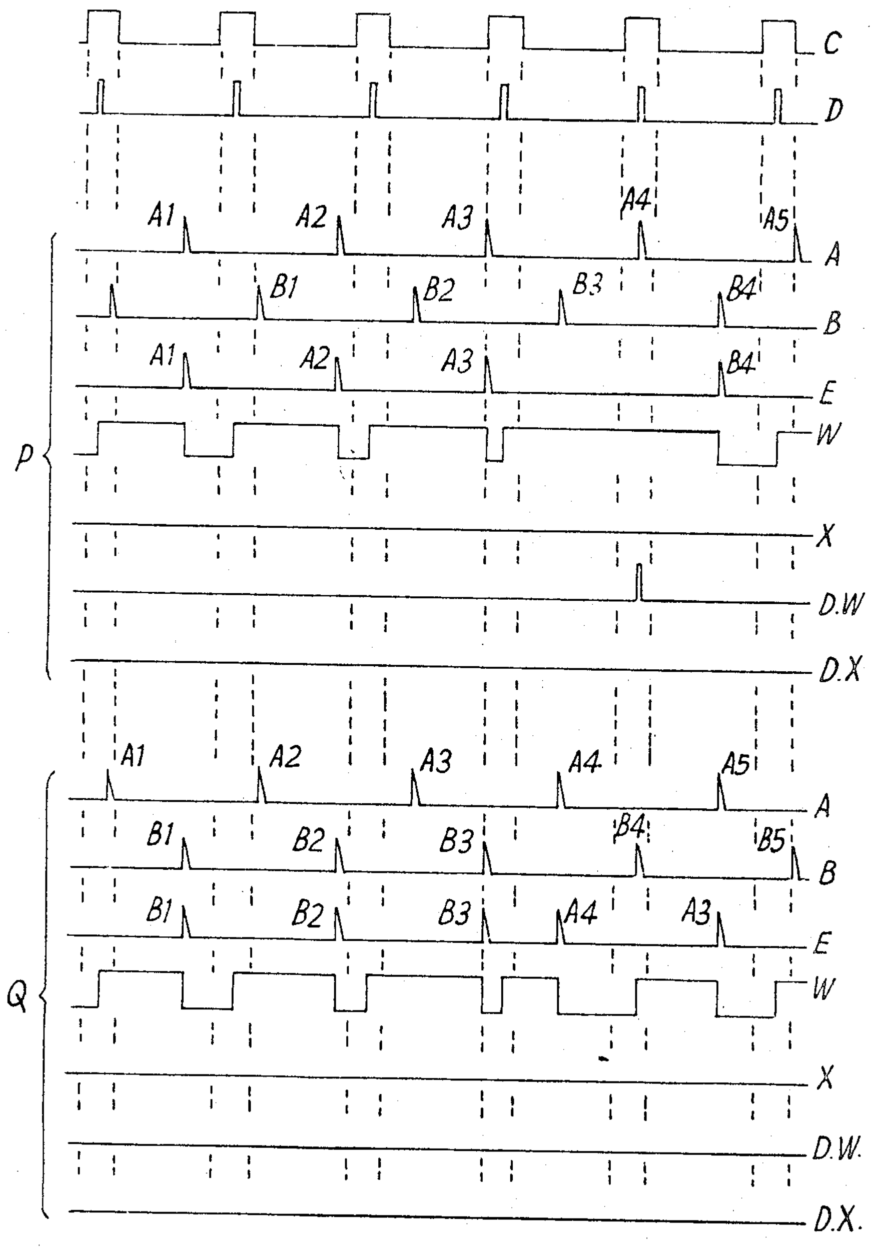
INVENTORS
HOWARD MUMFORD
PETER WILLIAM SMITH
DAVID HALLIDAY
BY Young + Thompson
ATTYS.

Fig. 9. (TIME DIAGRAM, FAST INCOMING SIGNAL)
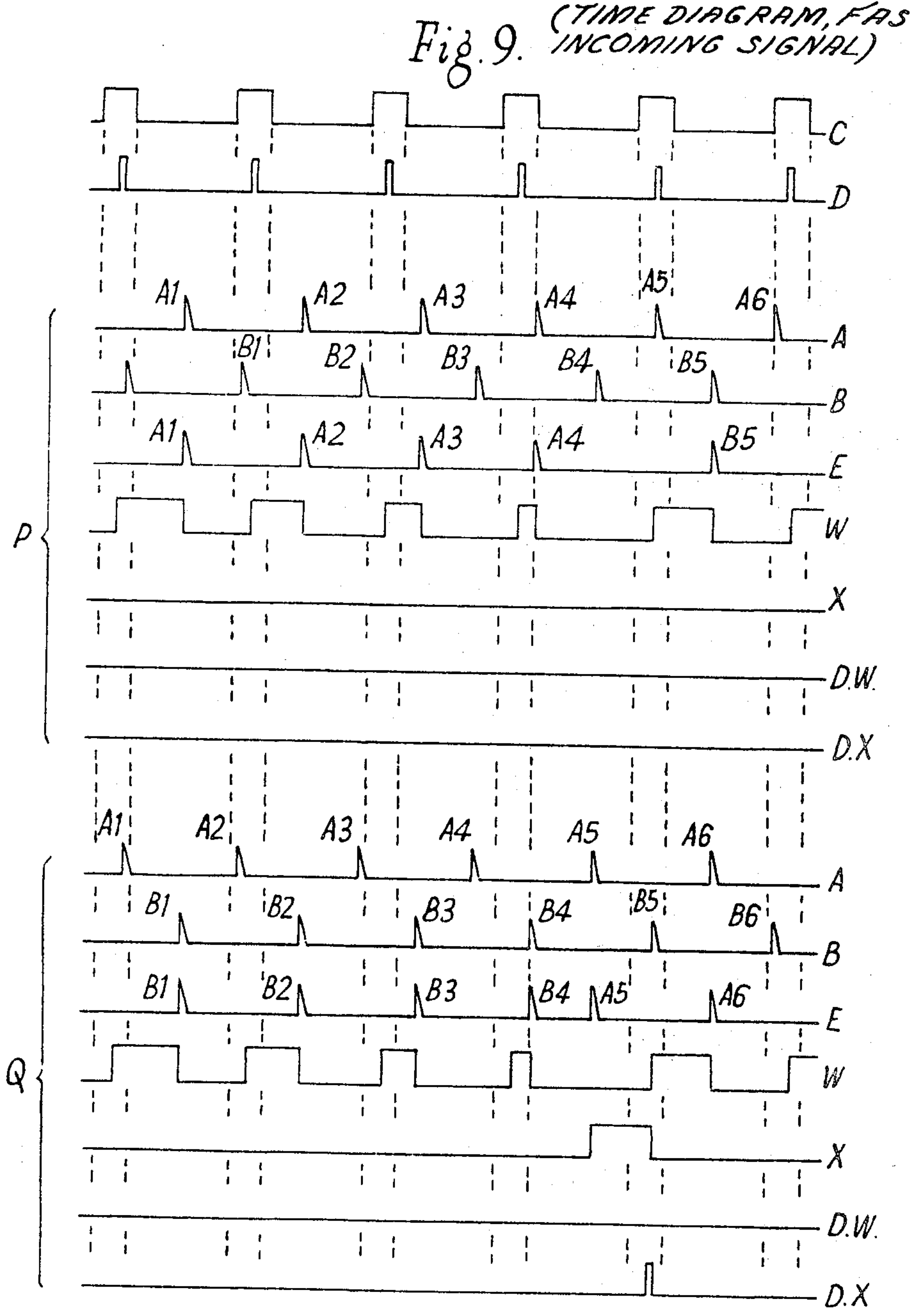
INVENTORS
HOWARD MUMFORD
PETER WILLIAM SMITH
DAVID HALLIDAY
BY Young + Thompson
ATTYS United States Patent Office 3,452,294

Patented June 24, 1969

3,452,294

DIGIT RATE SYNCHRONISATION OF A NETWORK OF DIGITAL STATIONS

Howard Mumford, Peter William Smith, and David Halliday, Taplow, England, assignors to British Telecommunications Research Limited, Taplow, England, a British company Filed Sept. 6, 1967, Ser. No. 665,888
Claims priority, application Great Britain, Sept. 6, 1966, 39,869/66
Inc. Cl. H03b 3/04
U.S. Cl. 331—11 8 Claims

ABSTRACT OF THE DISCLOSURE

In an electrical signalling system in which each station has its own oscillator, the oscillators of the various stations are maintained in synchronism with each other. The frequency of each oscillator is arranged to be controlled by a digital signal and each station has a means for storing such digital signal. The frequency of the oscillator at a station is repeatedly compared with that of the oscillator at each of the other stations in turn and one unit is added to the digital signal for each other oscillator which is found to have a higher frequency than the oscillator at such station and one unit is subtracted from the digital signal for each other oscillator which is found to have a lower frequency than such oscillator.

The present invention relates to electrical signalling systems of the kind in which each station in a signalling system has its own local timing oscillator and is particularly concerned with apparatus for maintaining the oscillators at the various stations in synchronism with each other. The invention has particular application to signalling systems which operate on a time division multiplex basis, one example of which is the transmission of a number of channels of speech by pulse code modulation. If such a system is to be adopted for ordinary commercial telephony on a large scale, a considerable number of different exchanges will be involved and problems of synchronisation will arise, since in general each exchange will have its own timing clock which will control the transmission of all outgoing signals.

Though it is now possible to produce pulse sources of high stability, it is inevitable that unless exceptionally high grade equipment is employed, which will generally not be economically justified because of expense, some drift in the operating frequency is bound to take place in course of time, and consequently it will be impossible to maintain synchronism between the clocks in the different exchanges unless special measures are taken. The chief object of the present invention is to provide a system suitable for a number of exchanges in which correction for drift of the pulse sources automatically takes place and a single frequency is effective for the whole system.

According to the invention, apparatus for varying the frequency of a local oscillator to bring it into agreement with the average frequency of a plurality of other oscillators of nominally equal frequency, comprises means for receiving a signal from each oscillator, phase detection means for each incoming signal arranged to determine each occurrence of a first condition when said signal achieves a first predetermined phase relationship to, and has a higher frequency than the output of the local oscillator and each occurrence of a second condition when said signal achieves a second predetermined phase relationship to, and has a lower frequency than, the output of the local oscillator and connecting means for increasing the frequency of the local oscillator on each occurrence of said first condition and decreasing the frequency of the local oscillator on each occurrence of said second condition.

In a practical embodiment, this arrangement would be applied to every oscillator in the system ensuring a continuous correcting action so as to result in a common frequency throughout the system. Since every correction takes place in discrete steps and as there is no continuous feedback loop there is virtually no tendency for hunting to take place and a high degree of stability is achieved.

The invention will be better understood from the following description of a preferred method of carrying it into effect which should be taken in conjunction with the accompanying drawings, in which:

FIGURE 1 is a block schematic of the general arrangement of the system;

FIGURE 2 indicates a typical way of extracting the digit rate; and a so-called edge detector for deriving two series of short pulses corresponding to the rise and fall of each square wave;

FIGURE 5 shows a circuit for deriving the positive and negative difference pulses;

FIGURE 6 indicates the use of a so-called fast clock circuit which may be required in some cases;

FIGURE 7 shows how the counts corresponding to the different incoming systems are combined using the fast clock of FIGURE 6; and FIGURES 8 and 9 show a number of timing diagrams indicating different conditions which may arise.

Figure 1:
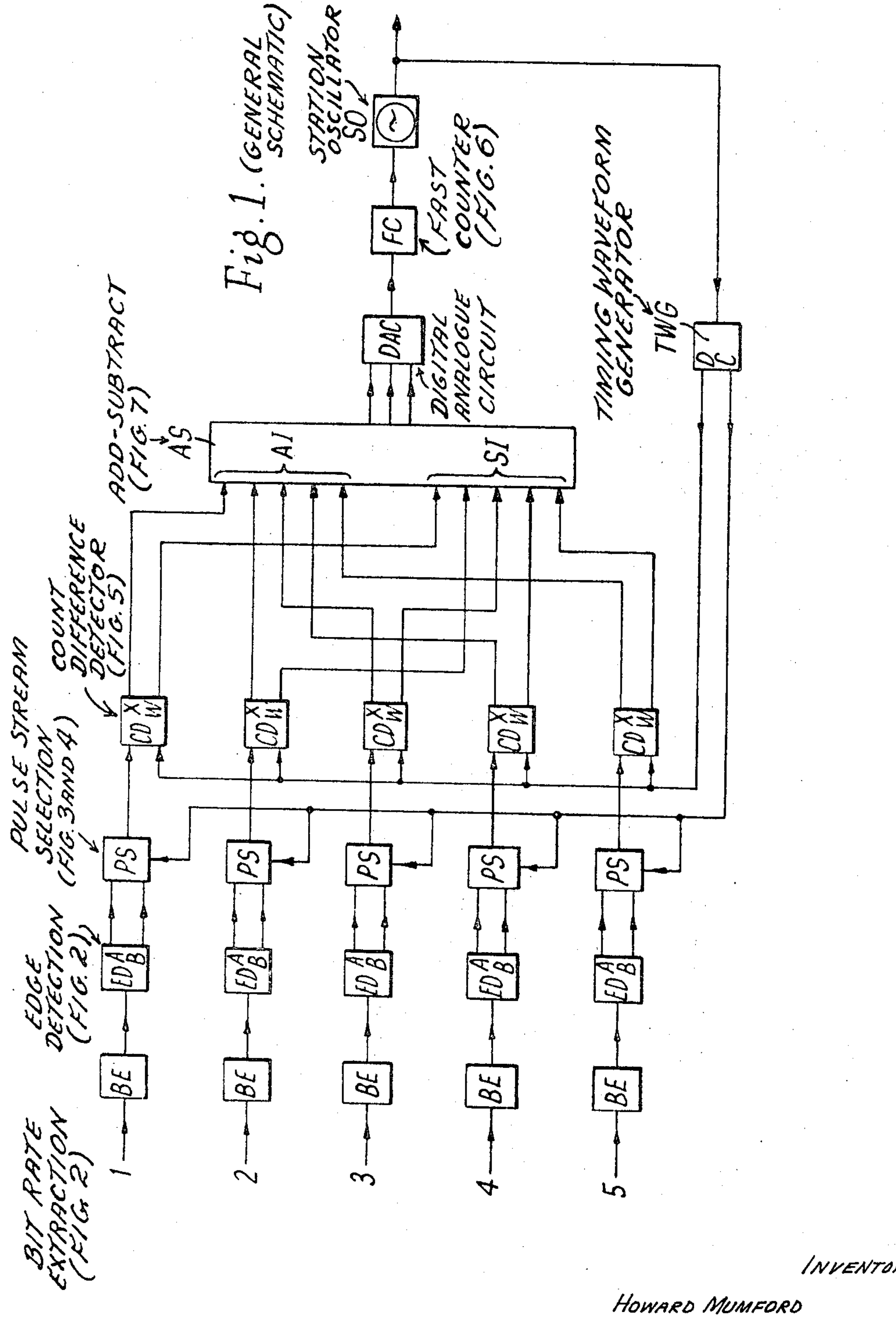
Figure 2:
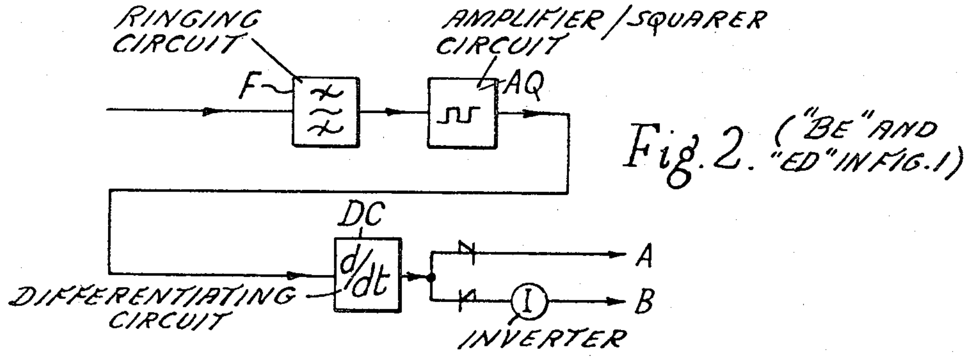
Figure 3:
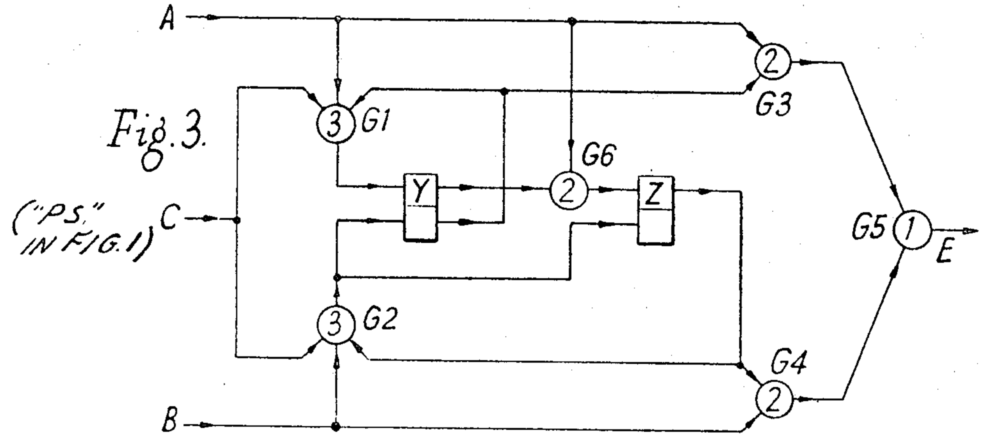
FIGURE 3 shows a circuit for obtaining a combined pulse stream having one pulse for each cycle even when coincidence occurs between the two sets of pulses which are being compared.
Figure 4:
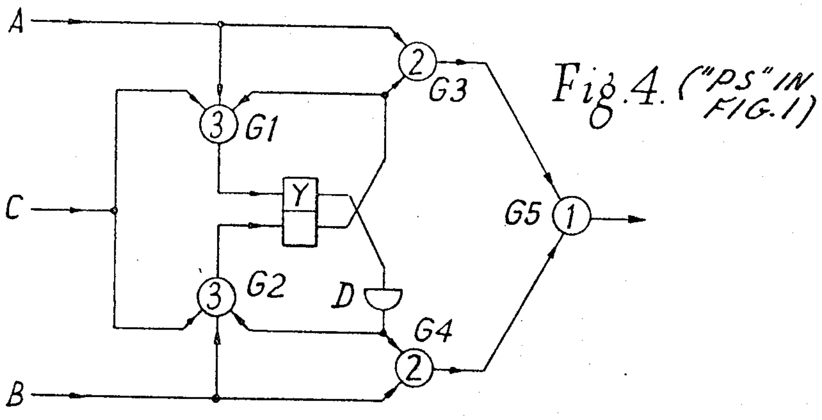
FIGURE 4 shows a somewhat simplified circuit which is adequate in certain circumstances.

Considering first the general layout indicated in FIGURE 1, it is assumed that signals are incoming from five different exchanges on leads 1, 2, 3, 4 and 5, but this number is merely typical and the actual number might be considerably greater. In each case the incoming signals extend to a bit rate extraction circuit BE such as is indicated in FIGURE 2, the output of which is a square wave with a frequency corresponding to incoming bit frequency. This is fed to an edge detection circuit ED such as is also shown in FIGURE 2 which produces short pulses, referred to as A and B, corresponding respectively to each rise and fall of the square wave. These pulses are supplied to pulse stream selection circuits PS such as are shown in FIGURES 3 and 4 which need also C pulses obtained from the local station oscillator SO by means of the timing waveform generator TWG. The output from this equipment passes to the count difference detector CD corresponding to FIGURE 5 which also requires D pulses from the timing waveform generator. The W and X conditions which form the output from this equipment are combined as regards the different incoming exchanges and are fed to the subtract inputs SI and the add inputs AI respectively of the add/subtract unit AS illustrated in FIGURE 7, which takes up a numerical position corresponding to the total discrepancy. This is converted into analogue form preferably as a voltage and used to control the frequency of the station oscillator so as to produce the required adjustment. It will be appreciated that a similar operation is proceeding at all the other exchanges in the system so that the final effect is to maintain a single frequency for the whole system.

Considering now FIGURE 2, it should be explained that any known or suitable equipment for extracting the bit rate or other suitable frequency may be employed, but it is assumed that use is made of a ringing circuit F which is in effect a bandpass filter, and the output from this extends to an amplifier/squarer circuit AQ which gives a square wave having positive and negative portions of approximately equal duration. This wave is applied to a differentiating circuit DC which provides short pulses of opposite polarity at the instants of rise and fall of the square wave and one set of these pulses is inverted by an inverter I so that they are then both of the same polarity.

The operation will be more readily appreciated from the time diagrams of FIGURES 8 and 9 of which FIGURE 8 shows the conditions when the incoming signal is slow, and FIGURE 9 those when the incoming signal is fast. The method of operation is that only one set of pulses is employed for the counting operation, but due to the slight discerpancy between the frequency of the incoming signals and the frequency of the station oscillator it is necessary at suitable intervals to change over from the A stream to the B stream and vice versa, and means must be adopted to ensure that when this takes place only one A or B pulse appears for each cycle of the square wave. The necessary control is achieved by C and D pulses obtained from the timing wave generator, the D pulses being very narrow pulses with a repetition frequency nominally equal to that of the A and B pulses. The C pulses are of the same frequency as D pulses but sufficiently wide to commence well before the D pulses and terminate well after them.

Considering now FIGURE 3, the operation will be dealt with from the state at which toggles or flip flops Y and Z are both in the reset condition. In these circumstances the gate G3 is open and the A pulses pass through it and extend by way of OR gate G5 to form the pulse train E which is supplied to the count difference detector of FIGURE 5. Gate G4 is closed at this time so that the B pulses are suppressed. However, the difference between the frequencies of the incoming pulses and the local oscillator will eventually mean sufficient phase displacement that one of the A pulses, A3 in the P group of waveforms in FIGURE 8, coincides with a C pulse. As a result, gate G1 is opened and toggle Y is set. This means that gate G3 is now closed to prevent the A pulses reaching the output, but the next A pulse A4 serves to set toggle Z by way of gate G6. Consequently when the next B pulse after A4 arrives, it is enabled to pass through gate G4 and extend to the output as part of the pulse train E. Toggles Y and Z are now both in the set condition and the B pulses are effective until the next occasion when a B pulse coincides with a C pulse. This is indicated at B3 in the Q group of waveforms in FIGURE 8. Thereupon a circuit is completed by way of gate G2 for resetting both toggles Y and Z and conditions are restored to the original state in which A pulses are allowed to pass through gate G3 to form the pulse train E. FIGURE 9 shows similar operations for the case in which the incoming signals are fast.

FIGURE 4 shows a circuit which is generally similar to FIGURE 3 but in which, however, toggle Z and gate G6 are eliminated by the use of a delay device D having a delay slightly greater than half the pulse repetition interval. This arrangement is satisfactory if the cycle time is short.

Referring now to FIGURE 5, it should be explained that normally each pulse of the combined pulse train will occur between successive D pulses. Each D pulse sets the toggle W and each pulse of the combined stream resets it so that if the output is sampled immediately prior to the D pulse, there will not normally be any output detected on the W lead. Where, however, a pulse has been suppressed as indicated in the P group of waveforms in FIGURE 8, toggle W will not be reset at the time of sampling, and thus there will be an output derived from the W lead. On the other hand, when conditions are as indicated in the Q group of waveforms in FIGURE 9, when the interval between the successive pulses of the combined train is less than normal, a further pulse will be received while toggle W is in the reset position and this will pass through the open gate G7 and permit the setting of toggle X which thus produces an output on the X lead when sampling next takes place. Toggle X is reset by the succeeding D pulse. The obtaining of this output is shown at DW in the P group of waveforms in FIGURE 8 and at DX in the Q group of waveform in FIGURE 9, the sampling time being regarded as the same as pulse D.

The method of combining the outputs on the W and X leads corresponding to the various incoming exchanges is shown in FIGURE 7 which assumes five such exchanges as in FIGURE 1. The various outputs from the different detectors shown in FIGURE 5, W representing one pulse less and X representing one pulse more, are combined by means of two sets of AND gates, one set for the X outputs and another set for the W outputs, and applied to the add input AI and subtract input SI of a reversible counter RC. It will be understood that correction is required comparatively seldom and the chances of correction pulses being obtained simultaneously from a plurality of difference detectors are very small indeed. Hence it may be satisfactory to ignore the likelihood of the operation being prejudiced because two similar pulses applied simultaneously count as only one or because simultaneous add and subtract pulses produce an indeterminate result. Accordingly if it is assumed that the effect of an occasional loss of a correcting pulse can be tolerated, the pulses which open the gates and are referred to as T1–T10 may be all the same and may even be represented by the pulse D. If, however, it is felt that this possibility of error cannot be accepted, pulses T1–T10 may be very short pulses in succession and all preferably between the beginning of the associated D pulse.

One manner in which this may be effected is shown in FIGURE 6 which makes use of a so-called fast counter or clock FC, the total period of which is less than the interval between the beginning of a C pulse and the beginning of the associated D pulse. The fast clock FC has twice as many steps as the number of pulses required so that the output can be taken from alternate stages and there is adequate separation between the pulses. At the beginning of pulse C, toggle V is set and thereupon opens the gate G8 to permit fast drive pulses DP from a suitable source to operate the clock. When the clock returns to its normal position after a complete cycle, gate G9 is opened and toggle V is reset. The clock then remains quiescent until the beginning of the next C pulse.

Returning now to FIGURE 7, the add and subtract outputs combined from each set of AND gates are fed to a reversible counter so that add pulses drive it forward and subtract pulses drive it backward. According to the position it takes up, a particular voltage output is obtained and this serves to adjust the frequency of the oscillator to bring it towards the average for all the incoming exchanges.

In a practical network, the received signals will have travelled over cables having appreciable time delays. Variations in the time delays from causes such as temperature changes produce changes in the phases of the incoming signals. It is undesirable that the changing phase of a signal shall produce a change in its pulse count and hence initiate a change of frequency. This will not occur if the time interval between the pulses being counted, i.e., A, B, C or D in FIGURES 8 and 9, is greater than the time interval represented by the maximum change in delay in any line. In practice it is convenient to use any subdivision of the digit rate conforming to this condition, for instance channel slots or complete frames, which already exists in the digital signal.

The invention therefore provides a simple solution to the problem of maintaining synchronism in a system making use of a number of basically independent oscillators located in the individual exchanges. This it does by a continuous averaging effect at each exchange so that though the frequency may vary, it will always be the same throughout the system.

We claim:

1. Apparatus for varying the frequency of an oscillator to bring it into agreement with the average frequency of a plurality of other oscillators of nominally equal frequency, comprising means for receiving a signal from each oscillator, phase detection means for each incoming signal arranged to determine each occurrence of a first condition when said signal achieves a first predetermined phase relationship to, and has a higher frequency than the output of the local oscillator and each occurrence of a second condition when said signal achieves a second predetermined phase relationship to, and has a lower frequency than, the output of the local oscillator and correcting means for increasing the frequency of the local oscillator on each occurrence of said first condition and decreasing the frequency of the local oscillator on each occurrence of said second condition.

2. Apparatus as claimed in claim 1, in which said correcting means includes a reversible counter arranged to have one unit added to its content on each occurrence of said first condition and to have one unit subtracted from its content on each occurrence of said second condition, the frequency of the local oscillator being determined in accordance with the content of said reversible counter.

3. Apparatus as claimed in claim 2, including circuit arrangements for converting said counter output into an analogue signal and applying such analogue signal to control the frequency of the local oscillator.

4. Apparatus as claimed in claim 2, in which the phase detection means comprises circuit arrangements for producing a first pulse train having said first predetermined phase relationship to its associated incoming signal and a second pulse train having said second predetermined phase relationship to said associated incoming signal, a bistable circuit arranged to connect either said first pulse train or said second pulse train to an output to form a combined pulse train and to change state when a pulse at said output overlaps with a pulse of a third pulse train which is in phase with the output of the local oscillator and a count difference detector arranged to compare the combined pulse train with a fourth pulse train, which is in phase with said third pulse train but has narrower pulses and to produce a first output when more than one pulse of said combined pulse train occurs between adjacent pulses of said fourth pulse train and to produce a second output when more than one pulse of said fourth pulse train occurs between adjacent pulses of said combined pulse train, said first output being operative to add one unit to the reversible counter and said second output to subtract one unit from said reversible counter.

5. Apparatus as claimed in claim 4, in which the count difference detector comprises a first flip-flop arranged to be set by pulses of the fourth pulse train and to be reset by pulses of the combined pulse train, a second flip-flop arranged to be set if a pulse of the combined pulse train is received when the first flip-flop is already in the reset condition and to be reset by pulses of the fourth pulse train and means for sampling the set outputs of the flip-flops immediately prior to each pulse of said fourth pulse train, the set output of the first flip-flop being the second output of the count difference detector and the set output of the second flip-flop being the first output of the count difference detector.

6. Apparatus as claimed in claim 4, in which the bistable circuit comprises a first and second flip-flop and first and second AND gates, the first flip-flop being arranged to be set when a pulse of the first pulse train coincides with a pulse of the third pulse train and the second flip-flop being arranged to be set when a pulse of the first pulse train is received and the first flip-flop is already set, both flip-flops being arranged to be reset when a pulse of the second pulse train coincides with a pulse of the third pulse train and the first flip-flop is already set, the first AND gate being arranged to connect the first pulse train to the output when the first flip-flop is reset and the second AND gate being arranged to connect the second pulse train to the output when the second flip-flop is set.

7. Apparatus as claimed in claim 4, in which the bistable circuit comprises a flip-flop and first and second AND gates, the flip-flop being arranged to be set when a pulse of the first pulse train coincides with a pulse of the third pulse train and to be reset when a pulse of the second pulse train coincides with a pulse of the third pulse train and such flip-flops was previously set, the first AND gate being arranged to connect the first pulse train to the output when the flip-flop is set but after a delay which is longer than half the pulse repetition interval and the second AND gate being arranged to connect the second pulse train to the output when the flip-flop is reset.

8. Apparatus as claimed in claim 4, in which a fast clock is arranged to sequentially sample each count difference detector once after each pulse of the third pulse train.

References Cited

UNITED STATES PATENTS 3,386,049 5/1968 Rorden ------------- 331—11

JOHN KOMINSKI, *Primary Examiner.*

U.S. Cl. X.R.

331—10, 17, 18